Aug. 23, 1966
C. YANIS ETAL
3,268,884
SHAFT ENCODER ASSEMBLY
Filed Oct. 2, 1962
7 Sheets-Sheet 1
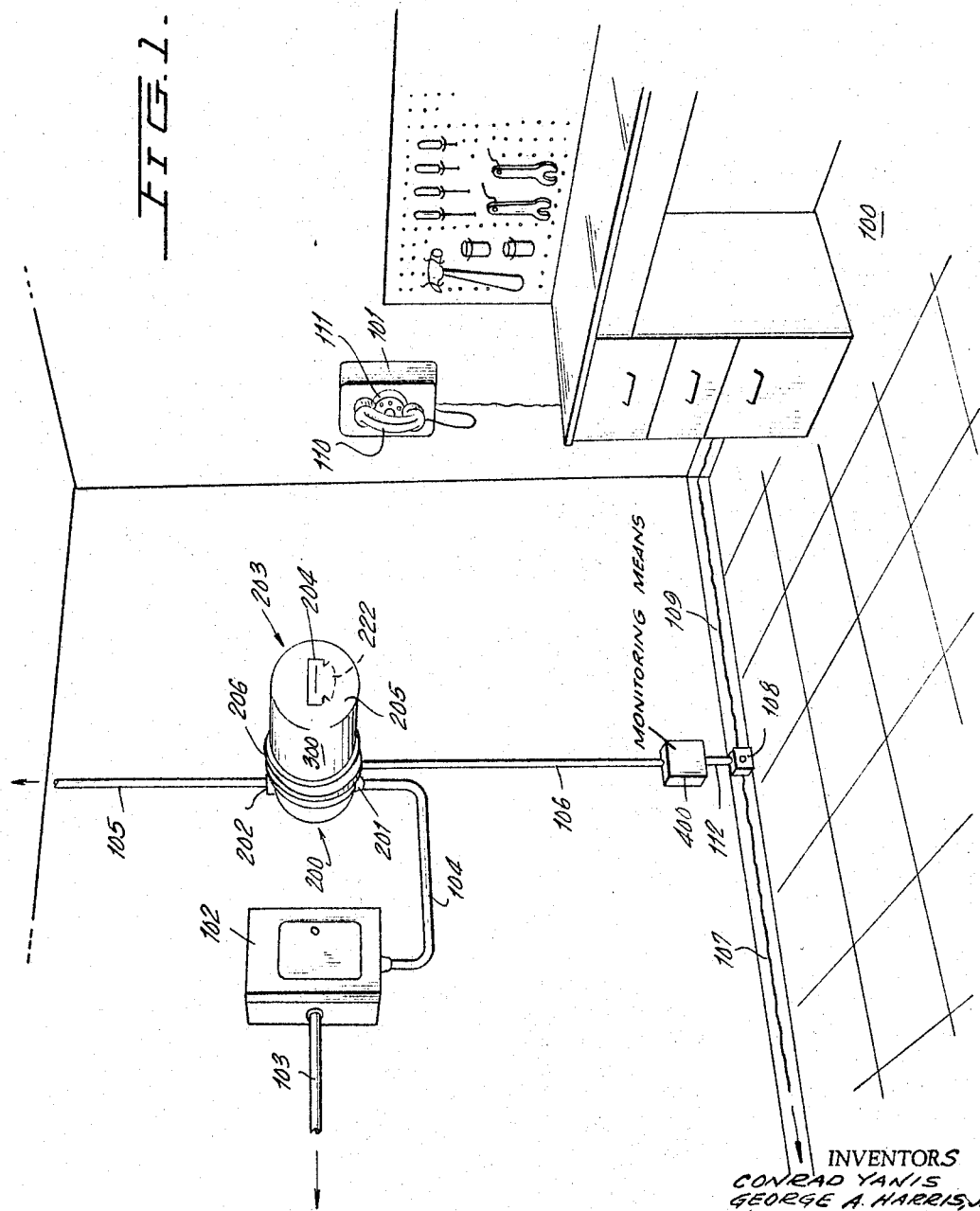
INVENTORS
CONRAD YANIS
GEORGE A. HARRIS JR.
NATHANIEL L. KAHN
MELVIN SCHRIER
BY
OSTROLENK, FABER, GERB & SOFFEN
ATTORNEYS

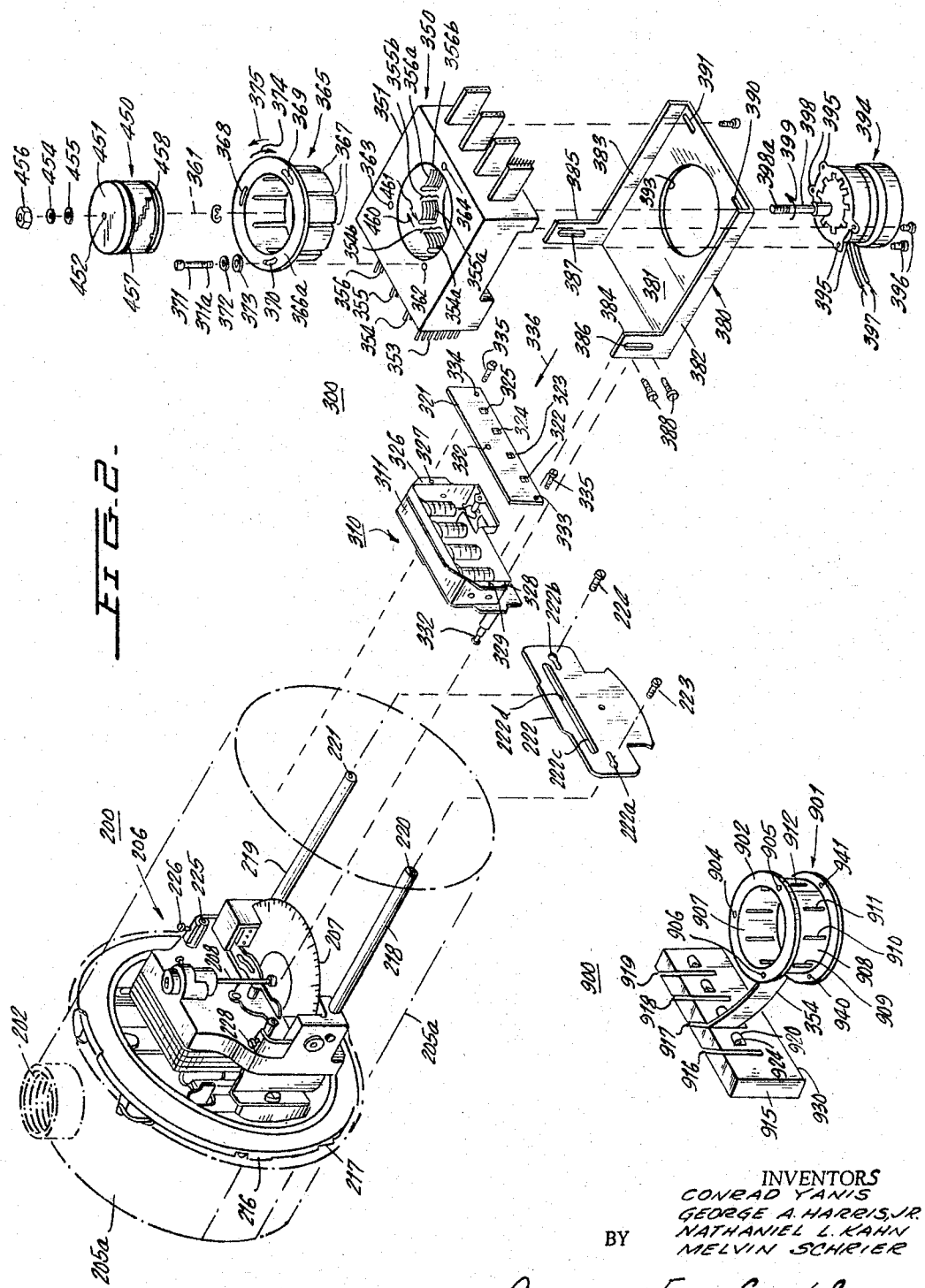

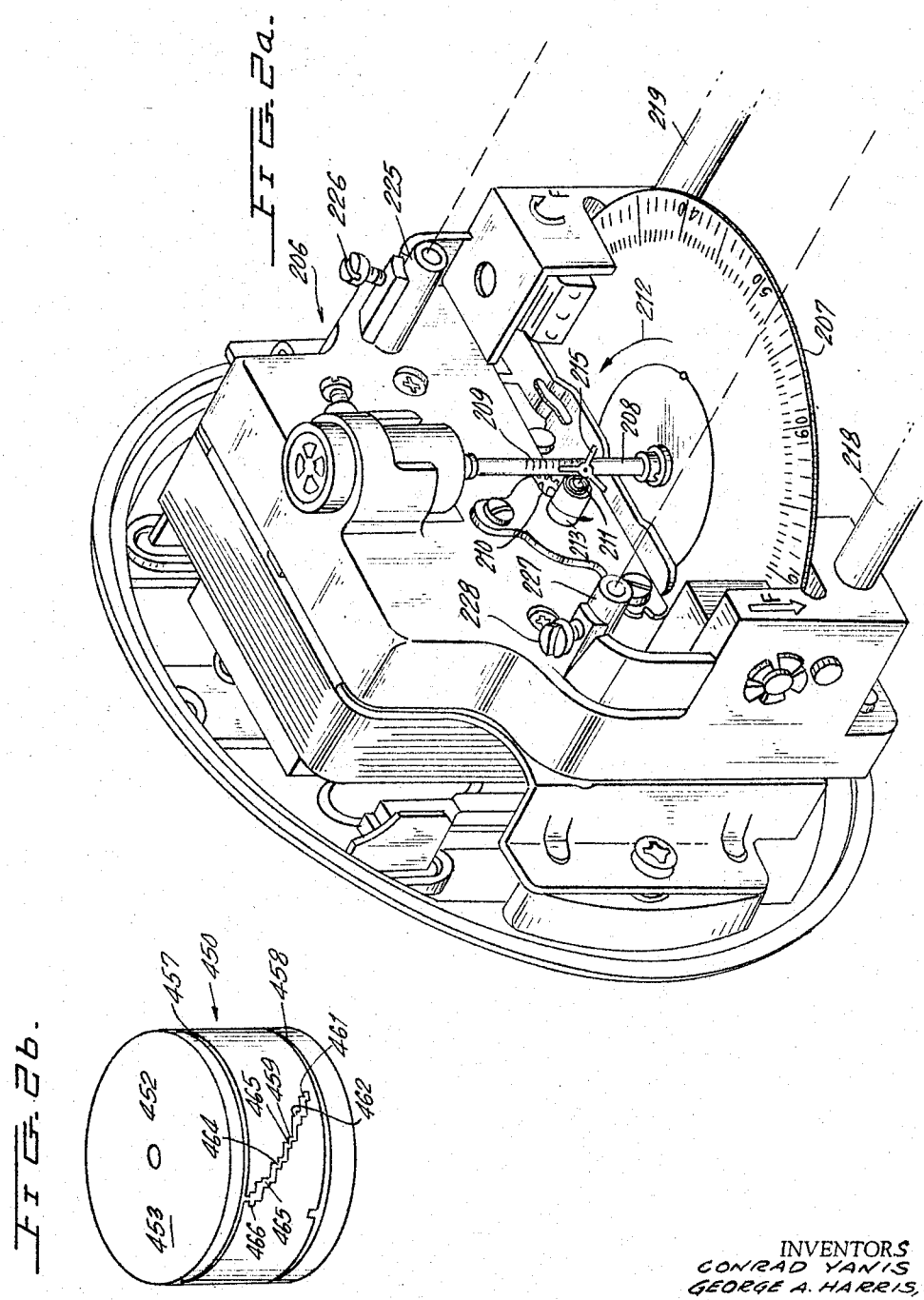

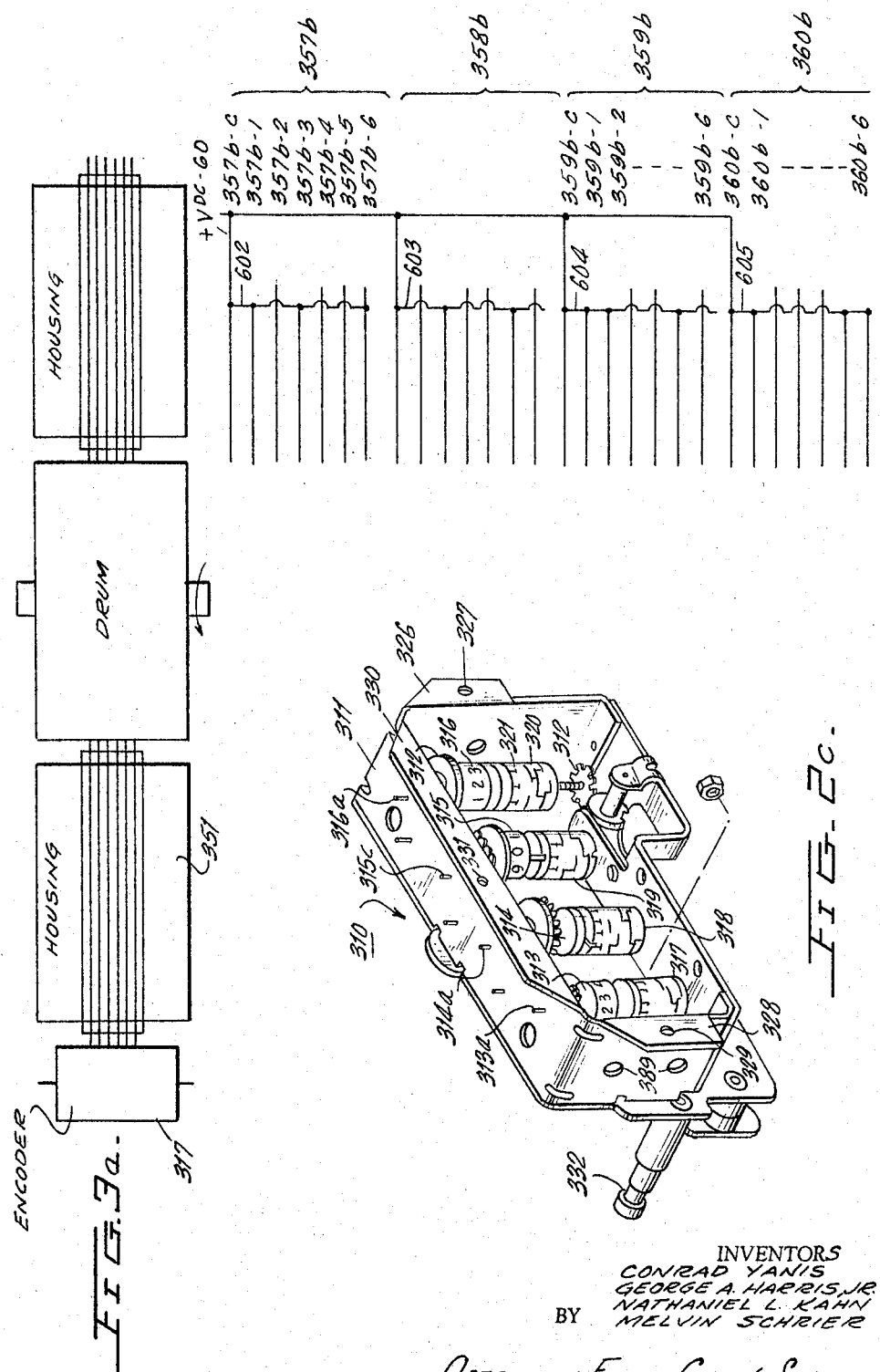

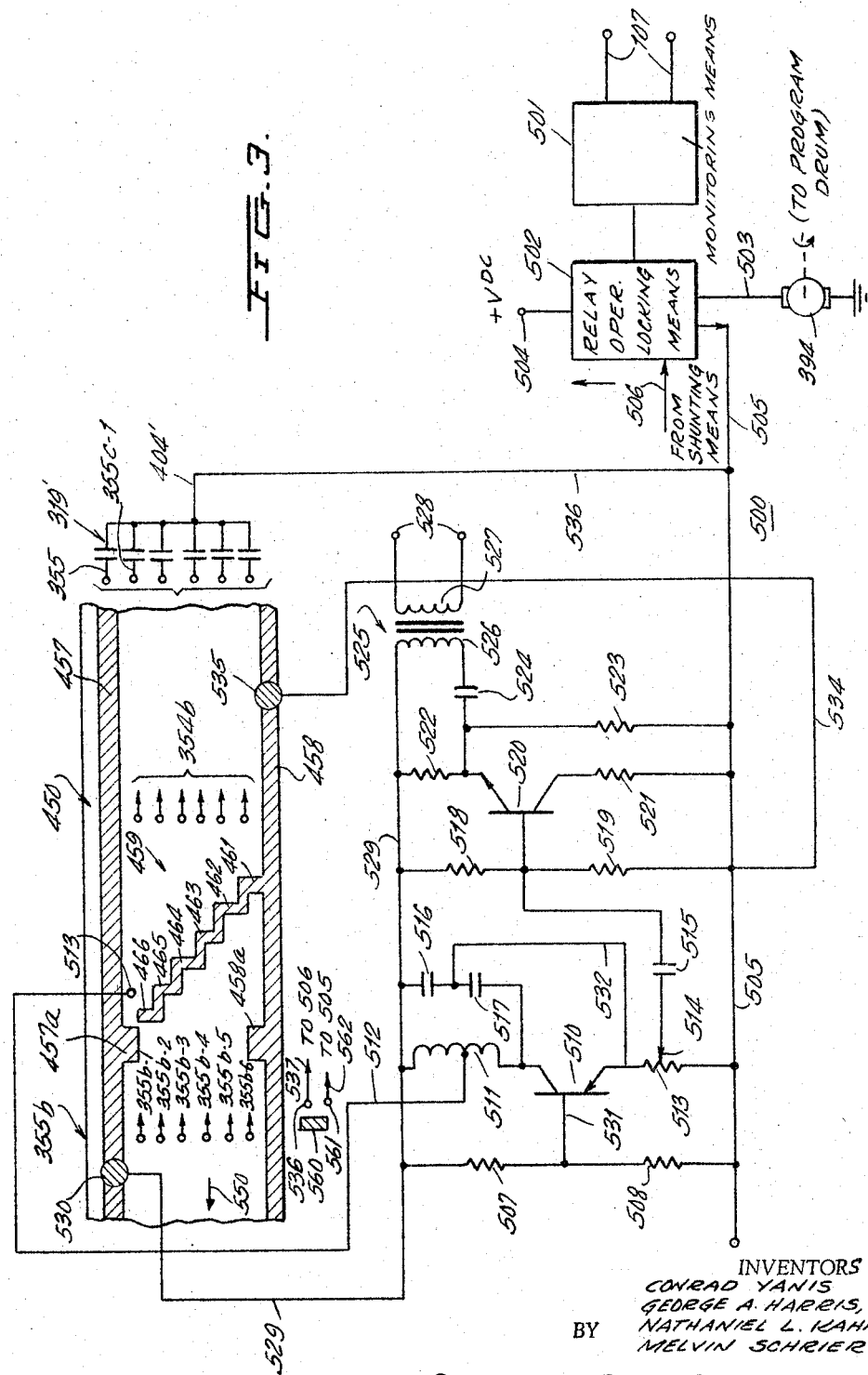

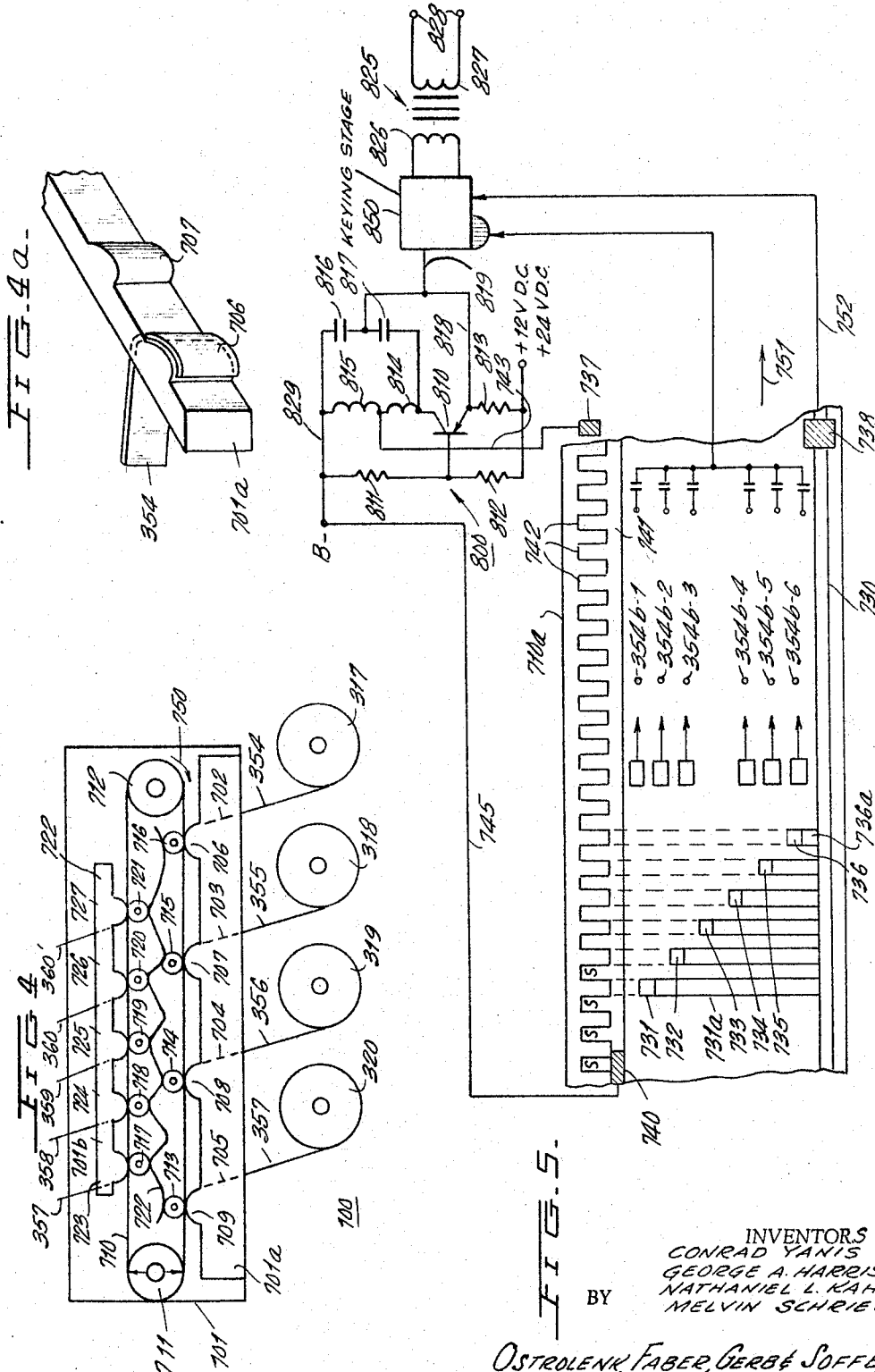

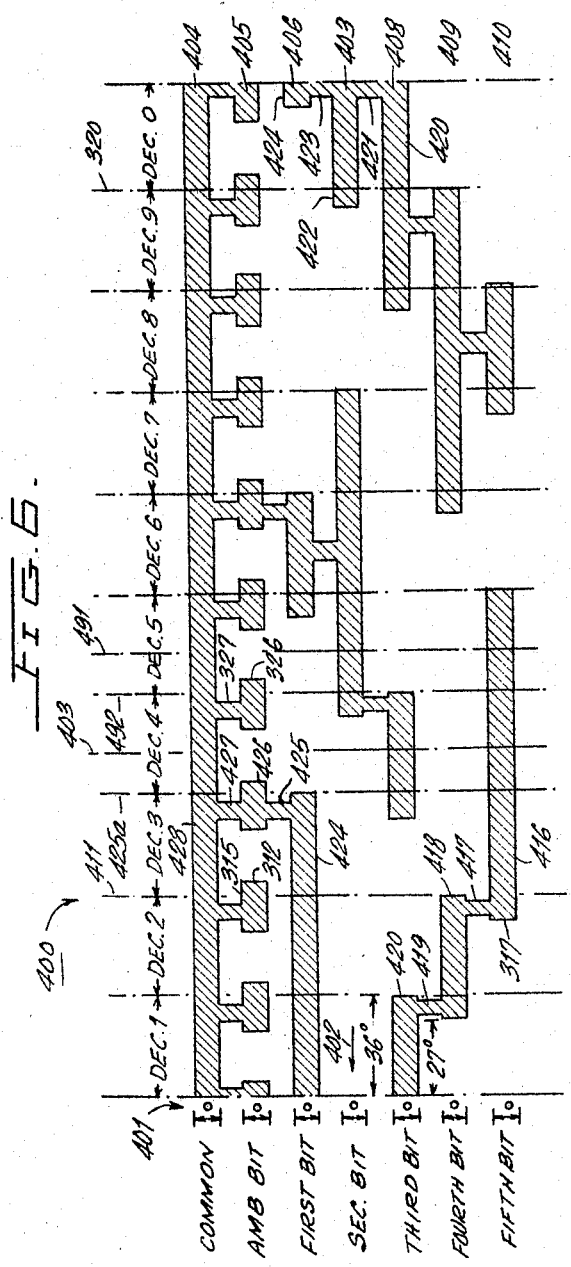

United States Patent Office 3,268,884
Patented August 23, 1966

3,268,884
SHAFT ENCODER ASSEMBLY
Conrad Yanis, Glen Rock, George A. Harris, Jr., Passaic, and Nathaniel L. Kahn, Glen Rock, N.J., and Melvin Schrier, Bronx, N.Y., assignors to Transitel International Corporation, Paramus, N.J., a corporation of New Jersey
Filed Oct. 2, 1962, Ser. No. 227,806
19 Claims. (Cl. 340—345)

This invention relates to data transmission systems and more particularly to a transmitter unit which is designed to perform analog to digital conversion and sequential transmission of the data being transmitted and which is designed to occupy a minimum amount of space adapting it for use with presently existing meter instruments such as, for example, standard electric, gas and water meters.

In data transmission systems which are comprised of a plurality of remote locations adapted to transmit data to a central location for subsequent processing of this data, such systems are usually comprised of transmitter facilities which are adapted to transmit, at the request of the remote location receiver facility, all of the data available at that remote location whereby the transmission takes place within a brief predetermined time period. In systems of this general type, extremely large numbers of remote transmitter facilities are employed and it is necessary, for this reason, that such transmitters be compact, safe, reliable and relatively inexpensive. One example of such a system is a remote meter reading system for reading the electric meters of all subscribers within a city or town, for example. Each electric company subscriber is provided with an electric meter measuring the accumulated quantity of watthours utilized by the associated subscriber. In such instances it is necessary that each such watthour meter instrument be provided with a transmitter facility capable of electronically or mechanically transmitting coded data representative of the watthour meter reading at the instant of time at which the transmitter became energized. Since the number of subscribers to an electric company facility is huge, an extremely large number of such remote transmitter facilities must be employed in order to provide for transmission from remote subscriber locations to the central location which may, for example, be the electric company main office facility which may further be provided with large scale digital computer means for processing the received data in order to perform the electric company billing operations.

In order to make such a system feasible, it is necessary that the remote transmitter facilities be readily adaptable to existing electric company meter equipment and further it is necessary that the installation of such remote transmitter facilities be a simple straightforward operation. In addition thereto, in the case of providing such automatic meter reading operations in homes presently under construction or to be constructed, it is further necessary that the remote transmitter facilities adapt themselves readily to future electric meter installations such that the installation of the electric meter itself will constitute a major portion of the installation of the transmitter facility. These requirements thereby construct a rigid framework of limitations for remote transmitter facilities such that the facilities must be safe and reliable in operation, be compact and, be readily and easily adaptable to both existing and future utility company meter facilities.

The instant invention provides a remote transmitter facility which is adapted to operate only upon receipt of a transmit request from the central location receiver facility and automatically transmit in a sequential manner coded pulses representative of the meter reading at that given instant, which data is then immediately available at the central location for processing, billing or other purposes. In addition to all of these functions, the transmitter facility is further adapted to be readily mountable to both existing and future meter facilities and is further so compact that the remote transmitter facility may be positioned within the same housing occupied by the meter equipment.

The instant invention is comprised of a shaft angle encoder assembly which provides the dual functions of making available a visual reading of the quantity meter being read, which quantity meter may be a meter of the type for measuring the accumulated quantities of electrical power, water or gas consumed by the subscriber; and the second function performed by the encoder assembly is that of automatically encoding the meter reading in order to facilitate transmission thereof. A transmitter assembly is cooperatively linked with the encoder assembly and provides the function of sequentially receiving and simultaneously transmitting the identifying code associated with the subscriber's meter and the encoded data representative of the meter reading at that given instant. All of the data is "paid out" in a sequential manner. The transmitter includes a programming means which selectively connects the subscriber meter identifying code information and subsequentially the encoder assembly to the transmitter output facility for impression of these encoded data bits upon a suitable communication media. One such medium is that of telephone lines which are employed to couple each remote transmitter location to a central location such as, for example, a telephone company central exchange point which is then linked by any suitable means to the utility company central office which in turn receives all such data for billing or other data processing purposes.

The programming means is comprised of a rotating member having associated therewith a plurality of sensing fingers which are employed to interconnect the shaft angle encoder assembly, the meter identifying code information and the transmitter output facility to the programming means by making wiping contact the revolving program drum.

In installations of this general type, it is extremely important that the equipment, in addition to having the characteristics of extreme reliability, must be able to maintain such constant reliability characteristics over extremely long periods of time and further, must be capable of being installed rapidly and without resort to complex installation procedures. These factors are of the utmost importance since in a system having thousands upon thousands of such remote transmitter facilities the problem of servicing and maintaining such a large number of transmitter facilities is a complicated one involving both large amounts of man hours and further requiring an extremely large investment for maintenance thereof. It is therefore necessary that the equipment be operable over a period of many years in duration. In order to provide all these advantageous features the programming has been so designed as to provide novel adjustment means for enabling simple ready adjustment of the sensing brushes which slidably engage the programming means. A housing is provided for substantially securing all of the sensing brush leads, while insulating each sensing member from the remaining members of the group. The housing means also includes means for movably mounting both the sensing brush adjusting means and the programming means to form a compact programming assembly. The entire transmitter facility is further so designed as to operate in a very confined space thereby enabling the transmitter to be mounted directly to standard type utility meters without any alteration whatsoever of the meter hardware. This enables the transmitter assembly to be readily and easily installed into already existing meters and likewise to be just as easily mountable to meters to be installed in future housing and industrial developments. The transmitter arrangement is further so designed to facilitate rapid, easy and yet reliable installation to the energy source and the communication media thereby making the overall installation operation simple and straightforward, while at the same time retaining a high degree of reliability therein. The transmitter output facility is designed to couple the encoded data bits to the communications medium and performs this by impressing predetermined sinusoidally varying frequencies upon the communications medium which frequencies are representative of the state of the code bits being transmitted.

The output facility further performs a monitoring operation such that the transmitter facility becomes operative only upon a transmit request signal received from the system's central location receiver facility. This keeps operating costs of the transmitter facility at an extremely low level.

It is therefore one object of this invention to provide a transmitter facility for encoding and transmitting meter data which is so designed to operate in an extremely confined space.

Another object of this invention is to provide a transmitter facility for encoding and transmitting data from a remote location which is so designed as to be readily adaptable for use with utility meters such as electric company watthour meters and the like.

Another object of this invention is to provide a transmitter facility for encoding and transmitting data at a remote location from a meter wherein the transmitter facility is so designed as not to interfere in any way with normal meter operation and which does not diminish the accuracy of the meter in any manner.

Still another object of this invention is to provide a remote transmitter facility for use with meters providing continuously changing readings which is so designed as to be contained within the meter housing.

Still another object of this invention is to provide a programmer for a remote transmitter facility which is so designed as to sequentially connect encoded data from an encoding means to a transmitter output facility and which is further designed as to occupy an extremely small volume.

Another object of this invention is to provide a programming assembly for a transmitter facility having a novel means for adjusting and maintaining contact pressure of the programming assembly sensing fingers.

Another object of this invention is to provide a remote transmitter facility for transmitting encoded data representative of continuously changing meter readings which transmitter facility includes monitoring means for energizing the transmitter upon a transmit request signal in order to initiate the transmit cycle.

Still another object of this invention is to provide a programming means for transmitter facilities having sensing fingers which are mounted in a novel manner.

Another object of this invention is to provide a transmitter facility having a shaft encoder assembly employing novel shaft angle encoder means for generating a unique coding arrangement representative of the continuously changing meter readings.

Still another object of this invention is to provide a novel encoder assembly for a remote transmitter facility which is readily adaptable to standard utility meters such as utility company watthour meters and the like.

These and other objects of this invention shall become apparent when reading the accompanying description and drawings in which:

FIGURE 1 is a perspective view of a typical meter installation housing the remote transmitter facility of the instant invention.

FIGURE 2 is an exploded perspective view of the transmitter facility of the instant invention showing the manner in which the transmitter facility is mounted to a meter.

FIGURES 2a through 2c are perspective views showing meter, program drum and encoders of FIGURE 2 in greater detail.

FIGURE 2d shows a perspective view of an alternative embodiment for the programmer housing of FIGURE 2.

FIGURE 3 shows the output signal transmission means for the transmitter facility of FIGURE 1 showing the electrical connections between the programming assembly and the output signal facility.

FIGURE 3a shows the electrical connections of the meter identifying code elements and the programming assembly.

FIGURE 4 shows an alternative embodiment for the programmer of FIGURES 2 and 3.

FIGURE 5 shows the electrical connections between the programmer of the type of FIGURE 4 and the transmitter output facility.

Referring now to the drawings; FIGURE 1 shows a typical home installation 100 comprising a subscriber telephone facility 101, a typical electric power fuse box 102 and a meter assembly 200 which may, for example, be of the watthour meter type and which is employed for providing a cumulative visual reading of the number of watthours which have been consumed by the subscriber. The fuse box 102 has a first cable 103 which is connected to a source of electrical energy in any well known manner. It is not necessary for the purpose of understanding the instant invention to describe the contents of the fuse box 102 in great detail, but it is sufficient to know that the fuse box 102 serves as the protecting means for preventing overload currents which may be fed to the equipment being energized by the source of electrical energy by having the fuses "burn out" or "blow" at predetermined values of fault current. In the alternative, fuse box 102 may be comprised of a plurality of circuit breakers having automatic trip means which are adapted to disconnect the energy source (not shown) from the equipment (not shown) which is being energized by the energy source at the subscriber's remote location.

The conductor path for the electrical energy being fed to the subscriber location 100 thereby extends through the lead in cable 103 to the fuse box 102 which is performed in such a manner that the fuses (or circuit breakers) are connected in series relationship with cable 103. The other terminals of the fuses (or circuit breakers) are connected to the load cable 104 which extends from fuse box 102 to one input terminal 201 of meter assembly 200. The energy is thereby passed through the meter assembly 200 which measures the accumulated watthours consumed by the subscriber. The electrical path extends from the source terminal 201 through the meter assembly 200 to the load side 202 of meter assembly 200. A cable 105 is provided for thereby feeding the electrical energy to suitable electrical outlets or receptacles (not shown) which are normally distributed throughout the various rooms of the subscriber location such as the rooms of a private home, for example. Thus, it can be seen that all energy fed to equipment used at the subscriber location is thereby fed through the meter assembly 200 so that an accurate cumulative reading is kept of the watthours consumed at the subscriber remote location regardless of which receptacle (not shown) which the subscriber may use to connect the source of energy to the equipment which the subscriber desires to operate. It is not necessary to consider in detail the equipment which the subscriber may desire to operate and in a typical home illustration such devices would be normally found in the area of appliances such as electrical washing machines, refrigerators, air conditioners, dryers, and the like.

Under present circumstances, in order to bill the subscriber for the watthours consumed at the subscriber location, it is necessary that an electric company representative be transported to the subscriber remote location to read the meter, such as for example, the meter 200 at each subscriber location. Each such meter is provided with a transparent housing or envelope 203 which is provided with a front, or face, portion 205. A dial face 204 is positioned within the housing 203 adjacent the face portion 205 to facilitate the taking of the meter visual reading.

The instant invention which is incorporated into the meter assembly 200, shown in FIGURE 1, is comprised of a transmitter facility 300, which can best be seen in FIGURE 2 of the drawings and which is directly linked with the watthour meter in the meter assembly 200 and which is adapted to accept the meter reading at the instant during which transmission is to take place, encode the meter reading into a code suitable for transmission through a communication media and sequentially impose this encoded data upon a transmitter output facility which in turn impresses the encoded information in the form of electrical signals upon the communication media. While the arrangement of FIGURE 1 shows the transmitter facility of the instant invention adapted for use with utility meters of the electrical or watthour type, it should be understood that the instant invention may be used with equal effectiveness in all types of quantity meters such as gas company and water company meters and may further be employed with meter facilities of the type employed in pay television systems or, more broadly, may be employed with any meter facility which is adapted to provide an either continuous or discrete readings which readings are representative of the quantity or items being measured by the meter facility.

The transmitter facility of the instant invention employs an all electronic monitoring device 400 which is electrically connected to the energy source and to the transmitter facility 300 by means of a cable assembly 106 which is provided with a plurality of conductors suitable to energize the monitoring means 400 and further to connect the monitoring means 400 to the transmitter facility 300. The monitoring device 400 is connected to the communications media which in the instant application is comprised of the telephone lines which are brought in to the subscriber location shown in FIGURE 1 by means of an incoming telephone cable 107. A suitable telephone cable junction box 108 is provided in order to connect the monitoring device 400 and the subscriber telephone facility 101 in parallel to the incoming telephone cable 107. A suitable cable 112 is provided to connect the junction box 108 to the monitoring means 400 and a second cable 109 connects junction box 108 to the telephone facility 101. As can be seen in this particular application, the telephone facility is the typical telephone handset type comprised of a hand receiver-transmitter member 110 and a dial assembly 111. As can be seen from FIGURE 1, the entire installation including the fuse box 102, meter assembly 200, telephone receiver handset 101 and monitoring means 400 provides a simple non-cluttered-straightforward arrangement which completely facilitates the installation and interconnection of these elements. The only distinction between meter installations presently in use and the meter installation shown in FIGURE 1 is the interconnection between the telephone line 107 and the meter assembly 200 such that the additional time required to complete the entire installation is extremely small relative to the time required to install present day meter assemblies. The monitoring device operates in such a manner as to energize the transmitter facility programming means which simultaneously encodes and transmits data in the form of electrical pulses from the transmitter facility through the monitoring means 400 to the telephone cable 107 which is suitably connected in any well known manner to the telephone company outdoor wires which typically lead to a telephone company central exchange office. From there the communication lines may be routed directly to the utility company central office or may be routed through one or a plurality of other central exchange offices before reaching the central office receiving facility. The transmitter facility further operates in a manner to be more fully described so as to de-energize the monitoring means 400 which, in turn, de-energizes the transmitter facility until its next operation and further places the monitoring means 400 in readiness for the next transmit request signal.

FIGURES 2–2d show the meter assembly 200 and the transmitter assembly 300 wherein the meter assembly 200 is comprised of a rear housing 205a having suitable openings for receiving the electrical cables 104, 105, and 106 shown in FIGURE 1, only one of the openings 202 being shown in FIGURE 2. The rear housing 205a houses the watthour meter instrument 206 which may be any standard watthour meter such as the commutator type watthour meters described in the Standard Handbook for Electrical Engineers edited by A. E. Knowlton, copyright 1949 by the McGraw-Hill Book Company, which commutator type watthour meters are set forth on pages 165 through 206 in section 3 of the handbook. It is not necessary for understanding the instant invention to provide a detailed description of the wattmeter components and mode of operation, but it is sufficient for the purposes of the instant invention to recognize that the wattmeter is provided with a commutator or disc member 207 secured for rotational velocity which is directly proportional to the power in the circuit being measured. Thus, each revolution represents a definite amount of energy and, by connecting the commutator to suitable registering means as will be more fully described, in this manner the total energy consumed by the subscriber is automatically registered.

The intermediate portion of the shaft 208 is provided with a straight wormgear configuration 209 which is adapted to drive a pivotally mounted wheel gear 210 only a portion of which is shown exposed to view. The wheel gear 210 is pivoted for rotational movement about a shaft 211 having a first end which extends from the cylindrical portion 213 of housing 214 which houses substantially all of the wheel gear 210 except for the portion shown exposed in FIGURE 2. The exposed free end of shaft 211 has mounted thereto a three-pronged star gear 215. The operation of the watthour meter is such that, as electrical energy is being consumed by the subscriber location this energy consumption is monitored by meter assembly 200 which operates such that the commutator disc 207 undergoes rotation in the direction shown by arrow 212 causing worm gear 209 to rotate both wheel gear 210 and star gear 215 in the direction shown by arrow 213. The star gear 215 is cooperatively linked with the cyclometer gearing assembly in a manner to be more fully described such that the rotation of star gear member 215 steps the dial assembly pointers of the dial face in such a manner as to provide an accurate visual dial reading which gives an indication of the watthours consumed by the subscriber up to and including the instant at which the meter is being read. It can therefore be appreciated that the watthour meter 200 is an analog device providing instantaneous analog readings indicative of the quantity of energy being measured. The watthour meter 206 is secured to the rear housing 205a in any suitable manner and is enclosed at its front portion by the glass housing 203 shown in phantom fashion in FIGURE 2 for the purposes of clarity. The glass cover or housing 203 is provided with a suitable flange 216 at its open end which cooperates with suitable clamping means 217 which is provided to position and secure the glass cover 203 to the rear housing 205a. Watthour meter 206 is further provided with a pair of tubular extensions 225 and 227 for receiving the projecting shafts of the shaft encoder assembly 310 shown in FIGURES 2 and 2c in a manner to be more fully described. Tubular extension 225 and 227 are further provided with suitable path tapped apertures (not shown) for receiving screw members 226 and 228, respectively, which are provided for rigidly securing the shaft encoder assembly 310 to the watthour meter after insertion of the shaft encoder projections into the openings of the tubular extensions 225 and 227.

The lower corners of watthour meter 206 are provided with tubular extensions 218 and 219 having tapped aperture 220 and 221, respectively for receiving identifying name plate 222. Identifying name plate 222 which can also be seen in FIGURE 1 is provided for the purpose of carrying the subscriber and meter identifying number for the particular subscriber so that when the visual reading is taken the associated meter identifying number is also visible to the party taking the visual reading. Name plate 222 is provided with first and second openings 222a and 222b for receiving screw members 223 and 224 which threadedly engage the tapped apertures 220 and 221, respectively. Name plate 222 is further provided with an elongated slot 222c through which a portion of the commutator disc 207 extends such that the projecting portion 222d extending downward from the upper side of slot 222c cooperates with the numbers provided along the periphery of the commutator disc 207 which disc may also be read in cooperation with the dials of the shaft angle encoder assembly 310 to provide a more accurate reading. As can be seen, the length of shafts 218 and 219 are chosen such that the name plate 222 is positioned in close proximity, to the front face 204 of the glass cover 205a in order to facilitate reading thereof.

The shaft angle encoder assembly 310 of the remote transmitter facility 300 is comprised of a housing 311 which acts as the support means for the gear assembly 312 provided within the housing 311. The gearing assembly 312 will not be set forth in detail herein since it lends no novelty to the instant invention, but it is sufficient to understand that the gear drive assembly is coupled to the star gear 215 in a manner well known in the prior art in order to develop a visually observable meter reading comprised of providing any decimal reading from 0000 to 9999 thus having a total decimal reading span of 10,000 which structure is similar to present day cyclometers. It can thus be understood that the gear drive has a stepping ratio wherein the gearing ratio between gears of adjacent decimal bit positions is in a ten-to-one relationship. Thus, for example, assuming that the right hand end of the shaft encoder assembly 310 houses the least significant decimal digit, it should be understood that the least significant decimal digit position will register the decimal number "1" upon one complete rotation of the commutator disc 207. The second most significant decimal digit position, however, will not register the number "1" [i.e. one-tenth of a revolution] until the least significant decimal digit position has experienced one complete revolution thus positioning the decimal number "0" in view of the reader while the next most significant decimal digit position will position the number "1" indicative of a reading of 10. The exact manner in which the gearing assembly drives the visual reading arrangement lends no novelty to the instant invention and the choice of the gearing arrangement is optional.

Four reading drums 313 through 316 are provided, each of said reading drums having the decimal numbers "0" through "9" printed along their peripheries which decimal numbers cooperate with the windows 322 through 325 of plate 321 in a manner to be more fully described in order to provide a visual reading of the energy being measured by the meter which may be readily and rapidly observed by the user. Each drum 313 through 316 is mounted for rotation upon an associated shaft 313a through 316a, respectively. The housing 311 is provided with first, second and third flanged portions 326, 328 and 330, each being provided with a tapped aperture 327, 329 and 331, respectively. These tapped apertures are adapted to threadably engage the fastening members 335 (only two of which have been shown for the purposes of clarity) which are inserted through the openings 334, 333 and 332 in panel 321 so as to position and secure panel 321 to housing 311. The windows 322 through 325 provided in panel 321 are positioned so as to cooperate with the drums 313 through 316, respectively so that when an observer is looking in the direction shown by arrow 336 only one of the ten decimal numbers on each of the drums 313 through 316 is visible through any window 322 through 325, at any given instant. This arrangement substantially eliminates the guess work of determining what position a pointer on a dial face in which arrangements are in wide-spread use in many present day meter registers.

Mounted immediately beneath each drum 313 through 316 and on the same shafts are the shaft angle encoders 317 through 320, respectively which are particularly adapted in a predetermined manner for encoding the decimal readings of the register 310 transforming these decimal readings into a predetermined binary coded arrangement representative of the decimal digits. This encoding function is performed by providing each of the encoder cylinders 317 through 320 by means of a conductive coating which is arranged in such a manner as to cooperate with the sensing fingers or members associated with each encoder so as to generate a two-out-of-five; three-out-of-five; or four-out-of six bit binary code representative of the angular orientation of the shaft upon which the encoder member rotates. Thus, it can be seen that the individual encoder elements 317 through 320 are mounted for rotation to the same shafts 313a through 316a, respectively, which experience rotation and which are integral elements of the cyclometer arrangement of the encoder assembly and register 310 such that the encoder elements 317 through 320 convert their angular orientations into binary codes representative of the cyclometer decimal readings.

Each encoder 317 through 320 is provided with a predetermined coding arrangement which is specifically adapted to generate the two-out-of-five, three-out-of-five and four-out-of-six coding arrangements. A development of the coding arrangement on each of the encoder elements such as the development shown in FIGURE 6 represents a flat view of the entire cylindrical periphery of the shaft angle encoder. Each encoder is comprised of a substantially cylindrical drum, such as for example, the drum 321 shown in FIGURE 2, having a conductive coating deposited on the cylinder surface. The coding arrangement shown in the tables 480, 480a, and 481 in FIGURE 6 are set forth in great detail in copending U.S. application Serial No. 125,247 entitled Code Stack filed July 19, 1961, by Abraham Brothman, et al. and assigned to the assignee of the instant invention.

Each decimal digit from 0 through 9 is represented in a "Gray" code which name is well known in the art as a name for which to distinguish a code upon which each binary bit position has great significance such as, for example, a binary coded decimal representation. It should be noted that each binary representation differs from its neighboring binary representation by a shift of only binary "one." For example, the representation for the decimal number "5" has binary "one" in the second and fifth positions [i.e. columns 2 and 5] while the representations for decimal numbers "4" and "6" have binary "ones" in columns 3 and 5 and 1 and 2, respectively. Thus, only one binary one position differs in adjacent representations which acts to minimize erroneous readings as is fully described in the above mentioned copending application. The two-out-of-five, three-out-of-five and four-out-of-six code representation have the further advantageous feature that each code representation has its own inherent self-checking feature. For example, in the two-out-of-five code shown in table 480 in any case in which less than or more than two binary "ones" appear in any coded representation, this is immediately recognized as an error condition.

The development 400 of FIGURE 6 shows the conductive coating in FIGURE 2c employed on the drum of each shaft angle encoder in order to generate the code set forth in the table 480, 480a and 481. In order to derive a clear understanding of the development of FIGURE 6 the sensing brushes employed for the conductive coatings on the drum periphery are shown as the group of six dots 401 lined up in vertical fashion at the left-hand end of FIGURE 6. The dynamic picture on the drum can be visualized by considering the sensing or wiping fingers 401 as being stationary while the drum moves in the direction shown by arrow 402 of FIGURE 6. Thus, the sensing fingers 401 slidably engage the conductive coatings [which are shown in shaded fashion] deposited along the drum surface.

In order to understand the generation of the appropriate code, let it be assumed, for example, that the drum then moves in the direction shown by arrow 402 such that the sensing fingers 401 occupy the position shown by phantom line 403 relative to the drum 400. Thus, in this position, the common sensing finger makes electrical contact with the conductive strip of row 404; the third bit sensing member makes electrical contact with the conductive strip in row 408 and the fifth bit sensing member makes conductive contact with the conductive strip in row 410. This generates the non-ambiguity code shown in table 480 for the decimal number five in which a binary one occurs in the two-position and the five-position, as shown by columns 2 and 5 of table 180. The conductive strips in the rows 405 through 410 are vertically connected by providing a continuous conductive path by means of the vertically aligned conductive strips which strips are positioned substantially parallel to the encoder drum longitudinal axis. For example, the conductive strip 416 is electrically connected to the common conductive strip 428 via the following electrical path:

Conductive strip 416 to vertical strip 417, strip 418, strip 419, 420, 421, 422, 423, 424, 425, 426 and vertical strip 427 to horizontal strip 428. It should be noted that in strip 420 of row 408 while shown as being divided into two parts due to the development of the drum, is actually one continuous member. Also in row 406 strip 424 has been divided into two parts, due to the development of FIGURE 6, but it should be understood that strip 424 is one continuous strip. Energization for each shaft angle encoder is provided by a suitable energy source to the common sensing finger of the sensing member group 401 which sensing member or finger wipes strip 428 since strip 428 is connected to each horizontal aligned strip. As can clearly be seen in FIGURE 6, the readout from the encoder 400 is derived simply by sensing the voltage connections on the remaining six sensing fingers of the group 401 to ascertain whether a voltage or no voltage condition exists at each sensing member as the sensing fingers wipe across the associated horizontally aligned conductive strips of rows 405 through 410. In the example of FIGURE 6, the presence of a voltage is interpreted as a binary "one" condition, while the absence of a voltage [i.e. the sensing finger wiping across an insulated portion of the drum] is interpreted as a binary "0" condition.

The unique coding arrangement of the drum surface lends itself readily to a simple, straightforward fabrication, thereof, thereby lending itself readily to a variety of different manufacturing procedures.

One method of producing each of the shaft angle encoders 317 through 320 is to form a cylindrical drum of an insulating material and provide the drum with an opening along its longitudinal axis suitable for rotatable mounting of the drum. A mask or stencil [not shown] is provided, which is a substantially flat sheet having cut-out portions which are related exactly and conform to the conductive areas shown in FIGURE 6. It should be understood that the dimensions of the mask are such that the length of the mask is substantially equal at least to the circumference dimension of the encoder cylinder. The masking stencil is then wrapped around the surface of the cylindrical drum and a suitable conductive material is either painted or sprayed upon the drum or, as another example, the entire drum with the stencil may be dipped into a conductive material such that the conductive material is deposited on the drum only at exclusive locations conforming to the cut-out portion of the drum periphery. The mask is then removed and the drum with the conductive coating is then suitably fired in order to permanently fix the conductive coating to the drum periphery. The completed product can be seen in FIGURES 2 and 2c which show the drums 317 through 320 with the conductive coatings permanently affixed thereto. Since the drum is formed of a suitable insulating material, the drum member itself serves as the insulating means for insulating the conductive strips in the same horizontal rows 405 through 410.

The second method for forming the shaft angle encoders 317 through 320 consists of preparing a flat sheet of suitable insulating material and depositing a conductive coating upon the flat sheet in a pattern identical to that shown in FIGURE 6. A cylindrical member is then prepared having a suitable hole to mount the drum for rotation in the manner as was previously described. The flat insulating sheet bearing the conductive coating is then wrapped around the circumference or surface of the drum and is secured to the surface of the drum with a suitable adhesive means.

A third method which may be employed to develop a shaft encoder drum of the type set forth above is by means of a printed circuit process. This is performed by producing a drum which is suitably adapted for rotation by provision of a hole along its longitudinal axis and then treating the surface of the drum with a light-sensitive material. A special purpose camera adapted to portray an image around the 360° surface of a drum is then provided for exposing the sensitized surface of the drum to a particular light pattern which pattern conforms to the conductive coating patterns shown in FIGURE 6 of the drawings. The exposed drum member is then placed in a path containing a solution for washing away the sensitized coating which has not been exposed to light. A conductive layer which lies immediately beneath the sensitized coating is likewise washed away by the bath which washes away the non-exposed portions of the sensitized coatings. Thus, remaining upon the surface of the drum is that portion of the sensitized coating which has been exposed to the light pattern and immediately therebeneath the conductive layer. The sensitized coating is then washed away in a second solution which, however, does not affect the metallic conductive layer immediately therebeneath. Thus, the final product results in a drum formed of an insulating member having a conductive coating with a configuration substantially identical to the pattern 400, shown in FIGURE 6 of the drawings. It should be understood that any of the three above recited methods produce comparable shaft angle encoder elements such that the choice of any one of the above mentioned methods thereby becomes optional.

The cyclometer and shaft angle encoder assembly 310, when completely assembled in the manner shown in FIGURE 2, has the face plate 321 secured to the upper half of the open face of housing 311 such that the windows 322 through 325 are substantially in alignment with the drums 313 through 316, respectively, which bear decimal numerals "0" through "9" as was previously described. The lower portion of the open side of housing 311 is substantially open and is adapted to receive the left-hand side of the programmer housing member 351 of the programming assembly 350 shown in FIGURE 2. The interconnections are such that the sensing members extend from the programming housing 351 so as to make wiping contact with the conductive strips provided on the shaft angle encoders for the purpose of transmitting the binary coded representation of the decimal reading through the transmitter facility to the central location receiving facility in a manner to be more fully described.

The programming assembly 350 of FIGURE 2 is comprised of a housing 351 having a substantially centrally located circular opening 352 for receiving the groups of sensing fingers, the programmer contact pressure adjusting means, and the programming drum in a manner to be more fully described. The housing member 351 is provided with suitable openings for receiving the sensing members 353 through 360, respectively. The sensing finger or sensing member assembly 357 is comprised of a substantially wafer-thin insulating body of material 357a made of any suitable plastic material which body 357a encapsulates a plurality of conductor members 357b such that all of the conductors lie in a side-by-side arrangement and all lie substantially in a single plane which plane is parallel to the outer surfaces of the tape-like body 357a. The conductive members 357b preferably do not have circular cross sections but on the contrary have substantially rectangular cross sections such that the conductors are relatively flat and thereby have substantially small thickness dimensions enabling the wafer-thin thickness of the body member 357a to be kept to a minimum. In addition the multi-cable tape member is extremely flexible making it relatively easy to use and is further sufficiently resilient to retain its orginal shape. This substantially flat, multi-conductor flexible tape is employed to advantage by "stripping" [i.e. by removing the insulated material from] the conductive members 357b so that they are bare, and mounting these stripped free ends so that they may be employed as sensing members or brushes which cooperate with the shaft angle encoders and the programmer member 450 in a manner to be more fully described. Four multi-conductor tape members 353 through 356 are embedded in the housing member 350 such that their free left-hand ends are positioned to make wiping contact with the shaft angle encoder 317 through 320, respectively, in a manner to be more fully described. The opposite ends of these multi-cable tape members [only members 354a through 356a can be seen in FIGURE 2] extending through the housing 350 and into the opening 352 so as to cooperate with the contact pressure adjusting means and the programming means in a manner to be more fully described. The conductors, such as for example, the conductors 354b are stripped such as to be exposed and thereby make wiping electrical contact with the programming means 450.

The contact pressure adjusting means 365 is comprised of a substantially cylindrical member 366 having a plurality of elongated slits 367 running substantially parallel to the cylinder longitudinal axis shown by the dashed line 361. The elongated slits 367 are provided for receiving the multi-conductor tape members 353 through 360 in a manner to be more fully described. The upper end of cylindrical member 366 is provided with a substantially circular flange 366a provided with arcuate slots 368 through 370. Each of the slots 368 through 370 cooperate with the tapped apertures 363, 364 and 362, respectively, for rigidly securing the contact pressure adjusting means 365 to the housing member 351. Only one such fastening arrangement is shown in FIGURE 2 and is comprised of a fastening member 371 which is threaded at 371a so as to threadedly engage tapped aperture 362. A first washer 373 and a lock washer 372 are provided for suitably rigidly securing cylinder 366 to housing 350. The adjusting assembly 365 is mounted to housing 351 in such a manner that the multi-conductor tape members are each positioned within one of the longitudinally aligned slots 367. For example, with the adjusting member 365 positioned in housing 351, multi-conductor tape 356a will be positioned within slot 367', multi-cable tape 355a will be positioned within slot 367" and so forth, such that each slot 367 receives one of the multi-conductor tape members 353 through 360. The arcuate slots 368 through 370 enable cylindrical member 366 to be rotated in the opposing directions shown by arrows 374, 375 in order to provide a plurality of contact pressure adjustments in a manner to be more fully described.

A housing member 380 is provided for positioning and securing the cyclometer and shaft angle encoder assembly 310 to the programming assembly 380. The housing member 380 is comprised of a base portion 381 having flanged ends 382 and 383 adapted to receive and position the housing member 351 therebetween. Each of the flanged ends are provided with extending arms 384, 385 respectively, wherein each arm is provided with a respective elongated slot 386 and 387. The slots are adapted to receive fastening means such as, for example, the fastening means 388 shown in FIGURE 2, which are threaded in any suitable manner so as to threadedly engage the tapped apertures 389 positioned on the left-hand sidewall of housing 311 which houses the cyclometer and shaft angle encoder assembly 310. The opposite arm 385 is secured to the right-hand side wall of housing 311 in a similar manner. Base portion 381 of housing 380 is further provided at its forward end with elongated slots 390 and 391 which are adapted to receive fastening members, such as for example, the threaded fastening member 392 which is provided for the purpose of threadedly engaging a suitable aperture [not shown] on the underside of housing member 351 in order to suitably secure housing member 380 to housing member 351. The base 381 of housing member 380 is further provided with a circular shaped opening 393 having a diameter substantially equal to the opening 352 provided in housing 351 so as to be aligned therewith. The elongated slots 390 and 391 permit relative movement between housing members 351 and 380 in order to align the openings 393 and 352 to further adjust the contact pressure between the bare ends of tape member 353–356 and their associated code drums 317–320 respectively. The diameter of opening 393 is substantially greater than the diameter of opening 352 in order to receive the eyelets 395 positioned along the top edge of the motor 394. Motor 394 is provided for rotating the programmer 451 of the programming assembly 450 in a manner to be more fully described and is provided with suitable input leads 397 which are connectible to an energizing source for the purpose of operating motor 394. The eyelets 395 are provided for receiving suitable fastening means such as for example the fastening members 396 which are suitably threaded so as to threadedly engage cooperating tapped apertures [not shown] appropriately positioned on the underside of housing 351 in order to position and secure motor 394 to housing member 351. The motor 394 is provided with a rotatable shaft 398 adapted to rotate in a direction shown by arrow 399 for the purpose of imparting rotational movement to the programmer in a manner to be more fully described.

An alternative embodiment for the housing 351 is shown in FIGURE 2 and is designated by numeral 900. The assembly 900 is comprised of a cylindrically shaped housing 901 flanged at its upper and lower ends 902 and 903, respectively. Upper flange 902 is provided with apertures 904 through 906 to cooperate with the arcuate shaped slots 368 through 370 contained in adjusting member 365, also shown in FIGURE 2. The central opening 907 of cylindrical member 901 is adapted to receive adjusting member 365. The cylindrical surface 908 of member 901 is provided with a plurality of slits 909 through 912 [ not all of the slits are visible in FIGURE 2], which slits are adapted to receive the multi-conductor tape members 353 through 356 and 357 through 360, respectively. The method of adjusting the contact pressure between the conductive members which engage the surface of the program drum 351 and the program drum itself is identical to that described above wherein the tape members are inserted through the slits such as, for example, the slits 909 through 912 in the housing member 901 in the same manner in which the housing 351 receive the tape members 357 through 360. A substantially solid member 915 is provided which member has a plurality of slits 916 through 919 for receiving the tape members 353 through 357. Member 915 is further provided with four sculptured portions [portion 920 being the only one which can be seen in FIGURE 2], each sculptured portion, such as, for example, the sculptured portion 920 has a tapped aperture [not shown] for receiving a threaded screw member 924 which is adapted to have its first end [not shown] enter into the slit 916 in order to bear against the tape member which is inserted into the slit 916 so that the tape member is rigidly positioned with respect to both the housing member 915 and the associated shaft angle encoder with which it makes wiping contact. This adjustment readily facilitates the insertion of the tape member into the solid member 915 and the positioning of each tape member within its associated slot, such as, for example, the tape member 354 in slot 917, so as to provide the proper contact pressure between the conductors of the tape assembly and the surface of the cooperating shaft angle encoder with which they make wiping contact. The housing 915 is further provided with suitable tapped apertures [not shown], along its under-side 930 which cooperate with elongated slots 931 and 932 shown in member 381 to permit further positioning of the housing 915 relative to the shaft angle encoders 317 through 320 so as to permit simultaneous adjustment of the contact pressure for all four tape members 354 through 357. This housing arrangement 900 thereby provides the additional feature of enabling independent adjustment of each tape member inserted through the associated slots 916 through 919 in housing 915, in addition to the adjustment of the housing 915 itself. Suitable apertures, such as the apertures 940 and 941 are provided in lower flange 903 of member 901 which cooperate with apertures 950 in member 381 to secure cylindrically shaped member 901 to plate 381.

The programming assembly 450 is comprised of a substantially cylindrical drum member 451 having an opening 452 extending through its upper 453 and lower (not shown) surfaces and substantially in alignment with the longitudinal axis of drum 451 which opening is adapted to receive the rotatable shaft 398 of motor means 394. The upper end of shaft 398 is threaded at 398a so as to receive washer members 454 and 455 and to be threadedly engaged by threaded fastening means 456, in order to rigidly secure drum 451 to shaft 398 so that any rotation of drum of shaft 398 is directly imparted to drum 451. The cylindrical surface of drum 451 is provided with first and second conductor bands 457 and 458 respectively and is further provided with the step-like conductive coating 459 for the purpose of sequentially transferring the electrical state of the shaft angle encoders to a transmitter in the form of a binary code representative of the shaft angle of its associated shaft 317a through 320a in a manner to be more fully described. The step-like conductive coating configuration 459 is positioned on the cylindrical surface of drum 451 so that each vertically aligned portion 461–466 makes sliding contact with one of the six conductors comprising each multi-conductor tape member in order to produce the sequential stepping operation. As a further stepping function, it should be noted that while the step-like configuration 459 makes sliding engagement in a sequential fashion with the conductive members of one multi-cable tape member, none of the other multi-conductor tape member conductors make engagement with the step-like configuration 459 such that only one multi-cable tape member makes sliding engagement with the vertically aligned steps of the step-like arrangement 459.

The multi-conductor tape members 357 through 360 are connected in such a manner as to set up a predetermined coded arrangement which connections are substantially permanently made and which further serve to generate a code representative of the meter identifying number which is utilized by the central station processing means (not shown) for purposes of identifying each subscriber, thereby facilitating the billing of each subscriber to the system.

The adjusting assembly 365 provided for adjusting the contact pressure between the bare conductors of the multi-cable tape members and the surface of the programming member drum 451 functions in the following manner:

Each of the multi-conductor tape members such as for example, members 354a and 356a extend through suitable openings in the housing 351 so as to project into the opening 352 provided in the housing. The tape members are bent substantially at right angles so that the conductors occupy a position substantially perpendicular to the drum surface as shown in FIGURE 2, whereby, upon insertion of drum 451 upon shaft 398 and into the circular opening 352 the conductors 354b through 356b slide into contact with the cylindrical surface of drum 451, each of the conductors 354b–356b thereby positioned substantially tangential to the cylindrical surface of drum 451.

Assuming that the contact pressure between the conductors of the multi-conductor tape members and the drum surface is insufficient and for this reason should be increased after insertion of the contact pressure adjusting assembly 365 into the opening 352, the cylindrical member 366 is rotated in a direction shown by arrow 375. This causes the conductors of the multi-conductor tape members such as for example, the conductors 355b of tape member 355a to move in the direction shown by arrow 461 thereby causing the individual conductors 355b to move towards the surface of cylindrical drum 451 thereby increasing the contact pressure therebetween.

If it is desired to reduce the contact pressure, cylinder 366 is moved in the direction shown by arrow 374 thereby causing the conductors such as for example, the conductors 355b to move in the direction shown by arrow 460. Thus, moving in a direction away from the surface of programming drum 451 thereby decreasing the contact pressure therebetween. Once the suitable contact pressure which is desired has been achieved, the cylindrical member 366 may be rigidly secured to the housing 351 by fastening member 371. The arcuate slots 368–370 are provided to permit a predetermined amount of latitude in the rotation of the adjusting assembly 365 in order to provide a substantially wide range of contact pressure adjustments.

FIGURE 3 shows the transmitter 500 employed for the purpose of transmitting electrical signals representative of the binary code conditions of the shaft angle encoders at the instant at which the reading is desired. The transmitter 500 is comprised of a monitoring device 501 connectable to the incoming telephone lines 107 (see also FIGURE 1) wherein the monitoring means 501 is provided for the purpose of recognizing a transmit request signal transmitted to the remote location from the central location such that the monitoring means 501 operates only in response to a transmit request signal and to no other signal in order to actuate the transmitter circuitry 500 in a manner to be more fully described. The monitoring means 501 plays no active part in the instant invention and therefore will not be described in great detail.

A detailed description of such a monitoring or selective ringing device is set forth in the U.S. Patents No. 3,219,758 and No. 3,196,213 and the descriptions set forth therein are incorporated herein by reference thereto. It is sufficient for purposes of understanding the instant device to understand that the monitoring device 501, upon receipt of the transmit request signal, acts to energize a relay-operated-self-locking means 502 which is connected to a source of positive D.C. energy 504 and which is further provided with two output leads or busses 503 and 505 which are connected to the motor 394 (see FIGURE 2) and transmitter circuitry 500 in order to provide for the energization of these devices. An input terminal 506 is provided on relay-operated-locking-means 502 for the purpose of de-energizing the relay means 502 which takes place at the end of the transmission cycle placing the transmitter means 500 in readiness for the next transmit request signal.

The transmitter 500 is comprised of an oscillator and tone generator arrangement having input terminals comprised of busses 505 and 529, bus 505 being connectable to the positive D.C. source through the relay means 502 as previously described. A voltage divider comprised of resistors 507 and 508 is connected across busses 505 and 529 and have their common terminal connected via conductor 531 to the base electrode of a PNP transistor 510. The emitter electrode of transistor 510 is connected via potentiometer means 513 to bus 505. The collector electrode of transistor 510 is connected by means of inductor 511 to the bus 529. Inductor 511 is provided with a center tap connected by means of a lead 512 to a sensing brush represented diagrammatically by the solid colored dot 513 for the purpose of causing transmitter 500 to generate a predetermined signal in a manner to be more fully described in order to generate a start signal representative of the fact that transmission from the remote transmitter location has been initiated. A feedback path between the input and output circuits of transistor 510 is established by means of conductor 532 which is connected between the emitter electrode of transistor 510 and the common terminal between capacitors 516 and 517. The remaining terminal of capacitor 516 is connected to bus 529 while the remaining terminal of capacitor 517 is connected to the collector terminal of transistor 510. Thus, a portion of the oscillating frequency signal developed by the tank circuit comprised of inductor 511 and capacitors 516 and 517 is fed via the lead 532 to the emitter electrode of transistor 510 thereby providing oscillating action therein. The output of the oscillator is taken via the movable arm 514 of the potentiometer 513 attached to the emitter electrode of transistor 510 and transferred via capacitor 515 to the base electrode of transistor 520 which is employed for amplification purposes. The base electrode of transistor 520 is further connected to bus 529 via resistor 518 and is connected via resistor 519 and lead 534 to the sensing member 535 which makes wiping contact with the programming means 450 in the manner previously described and which operates to selectively cut-off transistor 520 in a manner to be more fully described. The emitter electrode of transistor 520 is connected to bus 529 by means of resistor 522 while the collector electrode of transistor 520 is connected through resistor 521 to bus 505. Transistor 520 acts as a current amplifier for generating current of a magnitude suitable for operation of the transformer buffer means 525. The terminals of the primary winding 526 of transformer 525 are connected across the resistor 522 by means of the capacitor member 524. A voltage divider circuit is provided by means of resistor 523 having a first terminal connected to bus 505 and a second terminal connected to the emitter electrode of transistor 520. The secondary winding 527 of transformer 525 is provided with output terminals 528 which are connectible to the telephone incoming leads 107 in order to transmit the coded information to the receiver at the central location which is connected to the telephone incoming leads 107 either directly or via at least one and possibly a plurality of telephone company central exchanges.

FIGURE 3 shows a development of the portion of the cylindrical surface of programming means 450 showing the step-like configuration 459 provided on programming drum 451 for the purpose of describing the transmitting operation of the remote transmitter facility. The operation of this facility is as follows:

Upon receipt of the transmit request signal the monitoring means 501 causes the relay operated locking means 502 to provide energy to motor means 394 and to the transmitter circuit 500. Motor means 394 begins rotation causing program drum 451 to likewise be rotated in the same direction therewith. In FIGURE 3 arrow 550 represents the direction of movement of the programming assembly of 450 so that the conductors of each of the multi-conductor tape members sequentially make sliding engagement with the step-like conductive configuration 459 provided on the drum surface of programming assembly 450. As one example, FIGURE 3 shows the position of the surface of the programming assembly 450 immediately after the sensing brushes 354b have made sliding engagement with the step-like conductive configuration 459 and immediately before making sliding engagement with the conductors of the multi-conductor tape member 355b. The conductor 355b-1 is the first of the group of conductors 355b to make sliding engagement with the step-like configuration 459 and makes this sliding engagement with the vertically aligned segment 466. At this instant of time it will be assumed that shaft angle encoder 318 is being read and shaft angle encoder 318 will be represented by a plurality of contact pairs 318′ which are either open or closed depending upon the binary coded representation beneath the sensing fingers 355 at the same time at which the transmit request has been sent. Thereby, at this instant of time, the conductive path is comprised of resistor 519, lead 534, sensing brush 535, which makes continuous sliding engagement with the lower continuous conductive strip 458, the step-like conductive configuration 459, sensing conductor 355b-1, multi-cable tape member 355 [see FIGURE 2] to the conductor 355c-1 of the conductor group 355c which may or may not be connected to the common terminal [as represented by the contact pair symbol], thereby causing an either open or closed contact status. The common strip is shown by strip 404 [in FIGURE 6 of the drawings] and it is electrically connected to the conductive segments in the horizontal row 405 of the shaft angle encoder. The common strip represented as lead 404′ in FIGURE 3 is continuously connected to the voltage source 504 via bus 505 so that the common strip is always at a positive potential.

When a conductive path exists between the conductive segment in row 405 of the encoder which is being read, this places a positive voltage upon the base of transistor 520 causing the transistor to become conductive and therefore imposing the oscillating signal generated by oscillator 510 upon the transformer means 525.

When no conductive path exists through the shaft angle encoder then a complete electrical path does not exist between the base electrode of transistor 520 and the positive bus 505 causing transistor 520 to be in the non-conductive, or cut-off state, due to the voltage divider, thereby preventing any signal from being impressed upon the input winding 526 of transformer means 525. Thus, although oscillator transistor 510 continues to generate a substantially sinusoidally varying signal, no signal is impressed upon the output terminals 528 and, subsequently, upon the telephone communication lines 107. In this manner, the presence of this positive signal is interpreted as a binary "one" condition while the absence of this signal is interpreted as a binary "zero" condition or the reverse arrangement if desired. Each remaining bit position of the shaft angle encoder such as for example, the bit positions of the horizontal rows 406 through 410 [see FIGURE 6] is sequentially read in the same manner as was previously described with respect to the bit position read by the sensing member 355b-1, whereby the sensing members 355b-2 through 355b-6 sequentially make wiping engagement with the vertical segments 465 through 461 respectively.

Prior to the transmission of the coded information that is available at the encoder members and immediately upon initiation of rotation of the drum member 451, the segment 457a of conductive strip 457 of drum 451 makes wiping engagement with the sensing brush 513. At this given instant of time a conductive path exists from the center tap of inductor 511 through lead 512, sensing brush 513, conductive segment 457a, conductive strip 457, sensing brush 530 and lead 529 which is the negative or ground potential bus member. This substantially short-circuits the upper portion of inductor 511 thereby causing transistor oscillator 510 to oscillate at a substantially different frequency from that at which the transistor oscillator operates when the inductor member 511 has no portion of the inductance in the short-circuited condition. This substantially different frequency which occurs immediately prior to the beginning of transmission of the encoded data is interpreted at the central location as the transmission start signal thereby notifying the central location that the transmit request signal has been received and that transmission has been initiated in response thereto. At the same exact instant of time a second conductive path from the base electrode of transistor 520 through resistor 519, lead 534, sensing brush 535 to conductive strip 458, conductive segment 458a and sensing brush 536, lead 537 to bus 505. This electrical path impresses a positive D.C. voltage upon the base electrode transistor 520 driving it into conduction thereby enabling the transmission initiation signal generated by the oscillator transistor 510 to be passed through transistor 520 and also to transistor transformer 525 which is employed for impedance matching purposes to the telephone company communication lines 107 [see FIGURE 1].

The meter identifying code is transmitted in sequential fashion in a manner identical to that employed with respect to the coded information from the shaft angle encoders 317 through 320 respectively. FIGURE 3a shows the manner in which the conductors from the tape members 357 through 360 are wired in order to generate the appropriate meter identifying code information. The wiring arrangement 600 in FIGURE 3a is comprised of the tape members 357 through 360, the right-hand ends of which represent the right-hand ends of the tape members 357 through 360 as shown in FIGURE 2. The common terminal of each of the conductor groups 357b through 360b are connected to a positive D. C. source 601 for energization of the transmitter 500, shown in FIGURE 3. The remaining conductors 1 through 6 of each of the conductor groups 357b through 360b are wired by jumper wires 602 through 605, respectively, for imposing a positive voltage upon selected leads in order to produce the appropriate coded representation for identification of the particular meter associated with the transmitter. Considering both FIGURES 3 and 3a, the transmission operation for the meter identifying code portion of the transmission cycle is as follows:

The sensing brushes, as shown in FIGURE 3, that is the brush groups such as 355b and 354b may be considered to be the equivalent of two of the four addressing brush groups 357b–360b as shown in FIGURE 3a. Assuming therefore, that the conductive segment 466 on the program drum makes wiping engagement with the left-hand end of sensing member 357b–1, the conductive path at this instant of time is from resistor 519, lead 534, sensing brush 535, conductive strip 458, to vertically aligned conductive segment 466, sensing brush 357b–1 through jumper wire 602 [which is electrically connected to sensing brush 357b–1], common lead 357b–c to positive D.C. source 601 which is at the same voltage level as bus 505. This conductive path thereby impresses a positive D.C. voltage upon the base electrode of transistor 520 permitting transmission of the sinusoidally varying signal at this instant.

The upper portion of FIGURE 3a shows a cross-sectional view of the programming assembly and housing 350 and 450 of FIGURE 2 showing the inter-relation of parts therebetween.

The programmer drum 451 is normally so positioned as to sweep the coded information representative of the meter identifying code prior to sending the meter reading information such that the data first received by the central location is the four binary coded bits representative of the meter identifying number followed immediately by four binary coded characters representing the decimal digits of the meter reading. It should be understood, however, that a greater or lesser number of address characters and/or information characters may be selected depending only upon the needs of the user.

In order to de-energize the transmitter apparatus the remote transmitter facility is provided with a shorting strip arrangement [see FIGURE 3] which is comprised of vertically aligned conductive segment 560 and two cooperating sensing brushes represented schematically by the shaded circles 536 and 561. Sensing brush 536 is connected by means of lead 537 to the input terminal 506 which lead although not shown in detail is electrically connected to one terminal of a relay coil [not shown] within relay operating means 502. The sensing brush 561 is connected via lead 562 to bus conductor 505 which although not shown in detail is electrically connected to the opposite terminal of the relay coil [not shown] in relay operating means 502. The operation of the de-energized means is as follows:

After the completion of the sequential transmission of binary information from each of the code stack members and of the transmission of the meter identifying code binary bits, the vertically aligned conductive segment 560 moves to a position beneath sensing brushes 536 and 561. Thus an electrical path exists from lead 506 to lead 537, sensing brush 536, vertical segment 560, brush 561, lead 562 and bus 505 to relay means 502. This instantaneous circuit is a direct shunt across the coil [not shown] of relay operating means 502 causing deenergization of means 502. This causes transmitter circuit 500 to be deenergized and likewise causes deenergization of motor means 394. The deenergization of transmitter 500 terminates the transmission of data therefrom while the deenergization of motor 394 causes drum 450 to rapidly decelerate and ultimately to come to a standstill position placing programmer 450 and transmitter 500 in readiness for the next transmission cycle. The vertical segment 560 is located so that termination of transmission and deceleration of the programmer motor means 394 occurs upon the completion of the entire transmitter cycle and further so that when programmer drum ultimately comes to a standstill position the step-like sequencing configuration 459 is in the position to begin transmitting data from the encoders to the transmitter input terminals immediately upon the initiation of a transmit request signal received by the remote location. The sequencing configuration 459 is positioned far enough behind conductive segment 560 in order to allow motor means 394 to accelerate to the appropriate speed employed during the transmission cycle.

An alternative embodiment for the programmer 450 is shown in FIGURES 4, 4a and 5 and is comprised of a belt or conveyor-type programmer which is comprised of an endless belt member 710 wound about a drive pulley or roller 711 and a freely rotatable mounted pulley 712 wherein the drive pulley 711 is mounted for rotation to a motor shaft such as for example motor shaft 394 shown in FIGURE 2 of the drawings. The surface of the belt 710 can best be seen in FIGURE 5 and provides an arrangement similar to that shown in FIGURE 3 of the drawings which shows the cylindrical programmer means 450, and operates in a similar manner as will be more fully described. The programmer is provided with a housing 701 having first and second solid members 701a and 701b contained within housing 701. First solid member 701a is provided with suitable openings or slots 702–705 for receiving the multi-conductor tape members 354–357 which cooperate with the shaft angle encoders 317–320 respectively in a manner substantially identical to that shown in FIGURES 2 and 3. The opposite ends of multi-conductor tape members 354–357 extend through the openings 702–705 respectively in solid member 701a and are positioned to curve around the rounded projections 706–709 respectively, in the manner shown in the perspective drawing of FIGURE 4a. The belt 710 is positioned so that its outer surface makes sliding engagement with the conductor groups of each of the multi-conductor tape members 354 through 357 and is further provided with pivotally mounted roller members 716 through 713 respectively, which provide adequate contact pressure between the surface of the belt member 710 and the sensing brushes of each of the multi-conductor tape members 354–357 respectively.

The solid housing member 701b is provided with a plurality of rounded projections 723–727 which cooperate with the pivotally mounted rollers 717–721 respectively in order to provide adequate contact pressure between these members. Bias means 722 is provided for urging rollers 713–716 and 717–721 outward to maintain the contact pressure. Multi-conductor tape members are mounted relative to the rounded projection 723–727 in a manner identical to that with respect to the rounded projections 706–709 [two of which are shown in FIGURE 4a]. These multi-conductor tape members 357–360 and 360′ are employed as the meter identifying code tape members in a manner substantially identical to that shown in FIGURES 2 and 3 described previously. The operation of the belt type programmer is analogous to that shown in FIGURES 2 and 3 whereby, referring to FIGURE 5, the belt is provided with a conductive coating of a predetermined configuration in order to sequentially read-out each of the shaft angle encoders 317–320 and the meter identifying code. The belt surface 710a of belt member 710 is provided with a coating configuration which is comprised of a conductive strip 730 which is a continuous strip extending around the entire periphery of belt 710 and which is further electrically connected to each one of the conductive segments 731–736. The manner in which this normally is done is to provide a continuous conductive segment extending from the conductive strip 730 to each one of the segments 731–736 and then providing an insulating material such as the insulating strips 731a–736a which are deposited in the area between conductive segments such as for example, the conductive segment 731 and the conductive strip 730 in order to prevent the occurrence of any conductive path between sensing brushes wiping this conductive area thereby creating an erroneous signal and further permitting conductive contact only between segment 731 and sensing member 354b–1. The operation of the belt programmer is as follows:

The brush 740 continuously wipes the conductive strip 741 which is provided with a plurality of vertically aligned segments 742 electrically connected to the horizontally aligned strip 741. Brush 740 is connected via lead 745 to the ground D.C. bus 829 of the transmitter circuit 800. Brush 737 is connected via lead 743 to the common terminal between inductor members 814 and 815 thereby creating an electrical path [when a vertically aligned segment 742 lies beneath sensing brush 737] which extends from conductive strip 741, sensing brush 740, lead 745, bus 829, conductor 815, lead 743, brush 737 and one of the vertically aligned segments 742 to horizontally aligned strip 741. This short-circuits inductor member 815 thereby changing the oscillating frequency of the oscillator transistor 810 which frequency is impressed upon the keying stage 850 of the oscillator which is substantially identical to the amplifier stage of the transmitter 500 shown in FIGURE 3 of the drawings. Assuming that the belt moves in the direction shown by the arrow 751 in FIGURE 5 relative to the sensing brush group 354b, the first sensing brush to make contact with a conductive segment is brush 354b–6. Thus, when brush 354b–6 makes sliding engagement with conductive segment 736 a conductive path exists from segment 736, sensing brush 354b–6 through the shaft angle encoder [represented by the symbol for an electrical contact pair 355′] to the common strip of the shaft angle encoder to positive D.C. through to the ground potential and to lead 752, sensing brush 738 and conductive strip 730, which is electrically connected in turn to vertical segment 736. This conductive path impresses a positive D.C. voltage upon the amplifier at keying stage 850 thereby blocking the sinusoidally varying frequency generated by the transistor oscillator 810 so as not to be passed through the keying stage 850 to the transformer means 825 and ultimately to the telephone communication lines via the output leads 828. When the sensing brush makes wiping contact with a nonconductive segment due to the fact that the encoder bit position connected thereto presents an insulating surface to its associated sensing brush then the absence of a signal upon the keying circuit 850 permits the passage of a signal from transmitter 800 thereto so as to represent the presence of a binary zero condition for that encoder bit position.

It should be noted that the substantially different sinsoidally varying frequency generated by these synchronizing vertically segments 742 are interspersed between each bit of the shaft angle encoder binary coded information so that the synchronizing signals transmitted operate with central location receiver [not shown] in a manner fully set forth in pending U.S. application Serial No. 241,917, filed December 3, 1962, entitled "Data Receiver" and further set forth in U.S. Patent No. 3,196,213, issued July 20, 1965, entitled "Multiple Tone Transmitter" which were previously mentioned. Thus, in this arrangement, we have provided a belt programming means for sequentially transmitting binary coded data representative of the meter identifying code and of the meter reading at the instant at which the transmit request was received, which data may be directly employed for billing and other purposes by the central location computer facilities. The configuration of the belt and drum programmers are completely interchangeable and may be substituted for one another.

The embodiments set forth herein are designed so as to be extremely compact thereby occupying small volume enabling their use in situations in which there are limited space requirements thereby readily enabling their use in cooperation with utility type meters such as for example, electric, water and gas meters presently in use, and other such cyclometer or geared type meters which are employed for registering items or material to which a continuous type reading may be desired.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Means for transmitting data representative of a metered quantity to a remote location comprising encoding means for digitizing analog input data; transmitting means for generating signals transmitted to said remote location in accordance with said digitized data; and programming means for sequentially impressing said digitized data upon the input of said transmitting means; said programming means comprising a movable endless contact surface; brush means making wiping contact with said programming means for electrically connecting said transmitting means and said encoder means.

2. Means for transmitting data representative of a metered quantity to a remote location comprising encoding means for digitizing analog input data; transmitting means for generating signals transmitted to said remote location in accordance with said digitized data; and programmng means for sequentially impressing said digitized data upon the input of said transmitting means; said programming means comprising a movable endless contact surface; brush means making wiping contact with said programming means for electrically connecting said transmitting means and said encoder means, said brush means comprising a plurality of multi-conductor tape members each comprising a plurality of spaced parallel conductors imbedded in a substantially flat tape insulating material.

3. Means for transmitting data representative of a metered quantity to a remote location comprising encoding means for digitizing analog input data; transmitting means for generating signals transmitted to said remote location in accordance with said digitized data; and programmng means for sequentially impressing said digitized data upon the input of said transmitting means; said programming means comprising a movable endless contact surface; brush means making wiping contact with said programming means for electrically connecting said transmitting means and said encoder means, said movable endless surface comprising an endless belt, a first driver pulley and a second driven pulley for moving said belt.

4. Means for transmitting data representative of a metered quantity to a remote location comprising encoding means for digitizing analog input data; transmitting means for generating signals transmitted to said remote location in accordance with said digitized data; and programming means for sequentially impressing said digitized data upon the input of said transmitting means; said programming means comprising a movable endless contact surface; brush means making wiping contact with said programming means for electrically connecting said transmitting means and said encoder means, said movable endless surface comprising an endless belt, a first driver pulley and a second driven pulley for moving said belt, said brush means comprising a plurality of multi-conductor tape members each comprising a plurality of spaced parallel conductors imbedded in a substantially flat tape insulating material, said tape members being positioned around the periphery of said belt; the surface of said belt having a conductive configuration for sequentially engaging the conductors of only one of said tape members at any given instant, said conductive configuration forming a step-like conductive surface adapted to sequentially engage the conductors of each of said tape members.

5. Means for transmitting data representative of a metered quantity to a remote location comprising encoding means for digitizing analog input data; transmitting means for generating signals transmitted to said remote location in accordance with said digitized data; and programming means for sequentially impressing said digitized data upon the input of said transmitting means; said programming means comprising a movable endless contact surface; brush means making wiping contact with said programming means for electrically connecting said transmitting means and said encoder means, said movable endless surface comprising an endless belt, a first driver pulley and a second driven pulley for moving said belt, said brush means comprising a plurality of multi-conductor tape members each comprising a plurality of spaced parallel conductors imbedded in a substantially flat tape insulating material, said tape members being positioned around the periphery of said belt; the surface of said belt having a conductive configuration for sequentially engaging the conductors of only one of said tape members at any given instant, said conductive configuration forming a step-like conductive surface adapted to sequentially engage the conductors of each of said tape members, said plurality of tape members forming a digitized data group and an identifying code group and a data readout group; the first ends of all of said groups of tape members being positioned to make wiping contact with said program means; the second ends of said data readout group of tape members being positioned to make wiping contact with said encoder means, a source of electric energy; circuit means connecting the second ends of said identifying code group tape members to said energy source in accordance with a predetermined arrangement to provide binary coded signals enabling the remote location to identify the transmitting means.

6. Means for transmitting data representative of a metered quantity to a remote location comprising encoding means for digitizing analog input data; transmitting means for generating signals transmitted to said remote location in accordance with said digitized data; and programming means for sequentially impressing said digitized data upon the input of said transmitting means; said programming means comprising a movable endless contact surface; brush means making wiping contact with said programming means for electrically connecting said transmitting means and said encoder means, said movable endless surface being a rotatable drum.

7. Means for transmitting data representative of a metered quantity to a remote location comprising encoding means for digitizing analog input data; transmitting means for generating signals transmitted to said remote location in accordance with said digitized data; and programming means for sequentially impressing said digitized data upon the input of said transmitting means; said programming means comprising a movable endless contact surface; brush means making wiping contact with said programming means for electrically connecting said transmitting means and said encoder means, said movable endless surface being a rotatable drum; said brush means comprising a plurality of multi-conductor tape members each comprising a plurality of spaced parallel conductors imbedded in a substantially flat tape insulating material, said tape members being positioned around the periphery of said drum; the surface of said drum having a conductive configuration for sequentially engaging the conductors of only one of said tape members at any given instant, said programming means housing having a plurality of elongated slots each being adapted to receive one of said tape members; said housing having an annular opening for receiving said program drum; annular adjusting means positioned in said opening adjacent said drum for adjusting the contact pressure between the conductors of said tape members and the surface of the drum.

8. Means for transmitting data representative of a metered quantity to a remote location comprising encoding means for digitizing analog input data; transmitting means for generating signals transmitted to said remote location in accordance with said digitized data; and programming means for sequentially impressing said digitized data upon the input of said transmitting means; said programming means comprising a movable endless contact surface; brush means making wiping contact with said programming means for electrically connecting said transmitting means and said encoder means, said encoder means comprising cyclometer means for generating a cumulative count of a quantity being measured; rotatable visual reading means for providing a visual reading of the state of the cyclometer means; shaft angle encoder means mounted to rotate with said visual reading means for generating a digital code representative of said visual reading.

9. Means for transmitting data representative of a metered quantity to a remote location comprising encoding means for digitizing analog input data; transmitting means for generating signals transmitted to said remote location in accordance with said digitized data; and programming means for sequentially impressing said digitized data upon the input of said transmitting means; said programming means comprising a movable endless contact surface; brush means making wiping contact with said programming means for electrically connecting said transmitting means and said encoder means, said encoder means comprising cyclometer means for generating a cumulative count of a quantity being measured; rotatable visual reading means for providing a visual reading of the state of the cyclometer means; shaft angle encoder means mounted to rotate with said visual reading means for generating a digital code representative of said visual reading, said shaft angle encoder means comprising a rotatable annular shaped member having a conductive coating along its periphery arranged in a predetermined manner to generate a digital code representative of said visual reading, said brush means comprising a plurality of multi-conductor tape members each comprising a plurality of spaced parallel conductors imbedded in a substantially flat tape of insulating material.

10. Means for transmitting data representative of a metered quantity to a remote location comprising encoding means for digitizing analog input data; transmitting means for generating signals transmitted to said remote location in accordance with said digitized data; and programming means for sequentially impressing said digitized data upon the input of said transmitting means; said programming means comprising a movable endless contact surface; brush means making wiping contact with said programming means for electrically connecting said transmitting means and said encoder means, said movable endless surface comprising an endless belt, a first driver pulley and a second driven pulley for moving said belt, said brush means comprising a plurality of multi-conductor tape members each comprising a plurality of spaced parallel conductors imbedded in a substantially flat tape insulating material, said tape members being positioned around the periphery of said belt; the surface of said belt having a conductive configuration for sequentially engaging the conductors of only one of said tape members at any given instant, said conductive configuration forming a step-like conductive surface adapted to sequentially engage the conductors of each of said tape members, said plurality of tape members forming a digitized data group and an identifying code group and a data readout group; the first ends of all of said groups of tape members being positioned to make wiping contact with said program means; the second ends of said digitized data group tape members being positioned to make wiping contact with said encoder means, transmitting means engageable with said endless belt for transmitting coded signals representative of the measured quantity to a remote location; said transmitting means comprising oscillating means for generating a sinusoidally varying signal; keying means for amplifying the signals from said oscillating means; said keying means having a control terminal for selectively deenergizing said keying means under control of said encoder means in accordance with the digitized data to be transmitted.

11. Means for transmitting data representative of a metered quantity to a remote location comprising encoding means for digitizing analog input data; transmitting means for generating signals transmitted to said remote location in accordance with said digitized data; and programming means for sequentially impressing said digitized data upon the input of said transmitting means; said programming means comprising a movable endless contact surface; brush means making wiping contact with said programming means for electrically connecting said transmitting means and said encoder means, said movable endless surface comprising an endless belt, a first driver pulley and a second driven pulley for moving said belt, said brush means comprising a plurality of multi-conductor tape members each comprising a plurality of spaced parallel conductors imbedded in a substantially flat tape insulating material, said tape members being positioned around the periphery of said belt; the surface of said belt having a conductive configuration for sequentially engaging the conductors of only one of said tape members at any given instant, said conductive configuration forming a step-like conductive surface adapted to sequentially engage the conductors of each of said tape members, said plurality of tape members forming a digitized data group and an identifying code group and a data readout group; the first ends of all of said groups of tape members being positioned to make wiping contact with said program means; the second ends of said digitized data group tape members being positioned to make wiping contact with said encoder means, said transmitting means engageable with said program drum for transmitting coded signals representative of the measured quantity to a remote location; said transmitting means comprising oscillating means for generating a sinusoidally varying signal; keying means for amplifying the signals from said oscillating means; said keying means having a control terminal for selectively deenergizing said keying means under control of said encoder means in accordance with the digitized data to be transmitted, the readout group tape member being adapted to sequentially connect said transmitting means control terminal to said data group and identifying group tape members, said program drum further comprising a continuous conductive strip electrically connected to said step-like conductive configuration; a first conductor of said readout group tape member being adapted to electrically connect said conductive strip with said control terminal, a second continuous conductive strip on said program drum, a second conductor of said readout group tape member adapted to connect said second continuous strip to said transmitting means; said second continuous strip having an extending portion of said strip extending away from said strip; a third conductor of said readout means tape member being adapted to intermittently connect said second conductive strip to said oscillator means; said oscillator means being adapted to alter the oscillating frequency when said second continuous strip is electrically connected to said oscillator means to thereby signify an initiation of transmission.

12. Means for transmitting data representative of a metered quantity to a remote location comprising encoding means for digitizing analog input data; transmitting means for generating signals transmitted to said remote location in accordance with said digitized data; and programming means for sequentially impressing said digitized data upon the input of said transmitting means; said programming means comprising a movable endless contact surface; brush means making wiping contact with said programming means for electrically connecting said transmitting means and said encoder means, said movable endless surface comprising an endless belt, a first driver pulley and a second driven pulley for moving said belt, said brush means comprising a plurality of multi-conductor tape members each comprising a plurality of spaced parallel conductors imbedded in a substantially flat tape insulating material, said tape members being positioned around the periphery of said belt; the surface of said belt having a conductive configuration for sequentially engaging the conductors of only one of said tape members at any given instant, said conductive configuration forming a step-like conductive surface adapted to sequentially engage the conductors of each of said tape members, said plurality of tape members forming a digitized data group and an identifying code group and a data readout group; the first ends of all of said groups of tape members being positioned to make wiping contact with said program means; the second ends of said digitized data group tape members being positioned to make wiping contact with said encoder means, said transmitting means engageable with said program drum for transmitting coded signals representative of the measured quantity to a remote location; said transmitting means comprising oscillating means for generating a sinusoidally varying signal; keying means for amplifying the signals from said oscillating means;

said keying means having a control terminal for selectively de-energizing said keying means under control of said encoder means in accordance with the digitized data to be transmitted, the readout group tape member being adapted to sequentially connect said transmitting means control terminal to said digitized data group and identifying code group tape members, said program drum further comprising a continuous conductive strip electrically connected to said step-like conductive configuration; a first conductor of said data readout group tape members being adapted to electrically connect said conductive strip with said control terminal, a second continuous conductive strip on said program drum, a second conductor of said readout group tape member adapted to connect said second continuous strip to said transmitting means; said second continuous strip having an extending portion of said strip extending away from said strip; a third conductor of said readout group tape member being adapted to intermittently connect said second conductive strip to said oscillator means; said oscillator means being adapted to alter the oscillating frequency when said second continuous strip is electrically connected to said oscillator means to thereby signify an initiation of transmission, said data transmitting means being normally deenergized monitoring means for energizing the transmitting facility under control of transmit request signal, said first and second continuous strip on said program drum having second and third extending portions extending towards one another; fourth and fifth conductive members of said readout group tape member adapted to intermittently connect said second and third extensions to said monitoring means for deenergizing said monitoring means upon completion of the transmission cycle.

13. The device of claim 2 further comprising:
a housing for said programming endless surface;
said housing including a first member for positioning a first end of each of said tape members to make wiping contact with said endless surface;
said first member being adjustable to regulate the contact pressure between said endless surface and said tape members.

14. The device of claim 6 wherein said brush means are each comprised of tape members positioned around the periphery of said drum;
the surface of said drum having a conductive configuration for sequentially engaging the conductors of only one of said tape members at any given instant, said conductive configuration forming a step-like conductive surface adapted to sequentially engage the conductors of each of said tape members.

15. The device of claim 7 wherein said adjusting means is provided with a plurality of slots for receiving an associated tape member;
said adjusting means being rotatable within said housing opening to appropriately adjust the contact pressure.

16. The device of claim 9 wherein said plurality of tape members form a digitized data group, an identifying code group and a data readout group;
the first ends of all of said group tape members being positioned to make wiping contact with said program means;
the second ends of said data group tape members being positioned to make wiping contact with the annular surface of said encoder means.

17. The device of claim 10 wherein the readout group tape member sequentially connects said transmitting means control terminal to said data group and identifying group tape members.

18. The device of claim 17 wherein said endless belt is further comprised of a continuous conductive strip electrically connected to said step-like conductive configuration;
a first conductor of said readout group tape member being adapted to electrically connect said conductive strip with said control terminal.

19. The device of claim 11 wherein said data transmitting means comprises normally deenergized monitoring means for energizing the transmitter facility under control of a transmit request signal.

References Cited by the Examiner

UNITED STATES PATENTS

| | | | |
|---|---|---|---|
| 2,283,072 | 5/1942 | Leathers | 340—183 |
| 2,287,786 | 6/1942 | Diamond et al. | 340—147 |
| 2,290,753 | 7/1942 | Keckley | 340—345 |
| 2,766,446 | 10/1956 | Bland | 340—345 |
| 3,103,001 | 9/1963 | Hage | 340—187 |

NEIL C. READ, *Primary Examiner.*

T. B. HABECKER, *Examiner.*

A. H. WARING, *Assistant Examiner.*